United States Patent
Nagasaki et al.

(10) Patent No.: US 6,914,031 B2
(45) Date of Patent: Jul. 5, 2005

(54) PHOTOCATALYST GRANULES

(75) Inventors: Yoichi Nagasaki, Hamamatsu (JP); Akira Osawa, Hamamatsu (JP); Jun Yamamoto, Hamamatsu (JP); Kunimasa Muroi, Hamamatsu (JP)

(73) Assignee: Yamaha Corporation (JP)

( * ) Notice: Subject to any disclaimer, the term of this patent is extended or adjusted under 35 U.S.C. 154(b) by 88 days.

(21) Appl. No.: 09/750,416

(22) Filed: Dec. 27, 2000

(65) Prior Publication Data

US 2001/0006933 A1 Jul. 5, 2001

(30) Foreign Application Priority Data

Dec. 27, 1999 (JP) .......................................... 11-371947

(51) Int. Cl.$^7$ .............................................. B01J 21/08
(52) U.S. Cl. ....................... 502/232; 502/240; 502/242
(58) Field of Search ................ 502/239, 242, 502/250, 251, 263, 232, 237, 350, 527.14, 527.16, 527.24, 174, 180

(56) References Cited

U.S. PATENT DOCUMENTS

| | | | | |
|---|---|---|---|---|
| 5,854,169 A | * | 12/1998 | Heller et al. ................. | 502/242 |
| 5,919,726 A | * | 7/1999 | Hatano et al. ............... | 502/227 |
| 5,965,479 A | * | 10/1999 | Suzuki et al. ................ | 502/182 |
| 5,981,425 A | * | 11/1999 | Taoda et al. ................. | 502/208 |
| 6,228,480 B1 | * | 5/2001 | Kimura et al. ............... | 428/328 |
| 6,383,980 B1 | * | 5/2002 | Hagihara et al. ............ | 502/340 |
| 2001/0006933 A1 | * | 7/2001 | Nagasaki ...................... | 502/239 |

FOREIGN PATENT DOCUMENTS

| | | | |
|---|---|---|---|
| JP | 8-164334 | 6/1996 | |
| JP | 09-299809 | 11/1997 | |
| JP | 10-156988 | 6/1998 | |
| JP | 11-188272 | 7/1999 | |
| JP | 2000-140634 | 5/2000 | |
| JP | 2000-288405 | 10/2000 | |
| WO | WO 9700134 A1 | * 1/1997 | ............ B01J/35/02 |

OTHER PUBLICATIONS

Chinese Office Action issued Nov. 7, 2003.

* cited by examiner

*Primary Examiner*—Edward M. Johnson
(74) *Attorney, Agent, or Firm*—Dickstein, Shapiro, Morin & Oshinsky, LLP.

(57) ABSTRACT

The photocatalyst granules of the present invention are photocatalyst granules prepared by molding a mixture containing photocatalyst particles and colloidal silica, and drying the molded mixture, wherein the content of the photocatalyst particles in the photocatalyst granules is 10% by weight or more. According to the photocatalyst granules of the present invention, since contact between the photocatalyst particles and the open air is not inhibited, thereby enabling the photocatalyst particles to contact with an organic matter sufficiently, oxygen or ultraviolet light, the photocatalytic activity is high. That is, the photocatalyst granules of the present invention are easy to handle and can be fixed on a solid, and also have excellent durability and high photocatalytic activity.

6 Claims, 1 Drawing Sheet

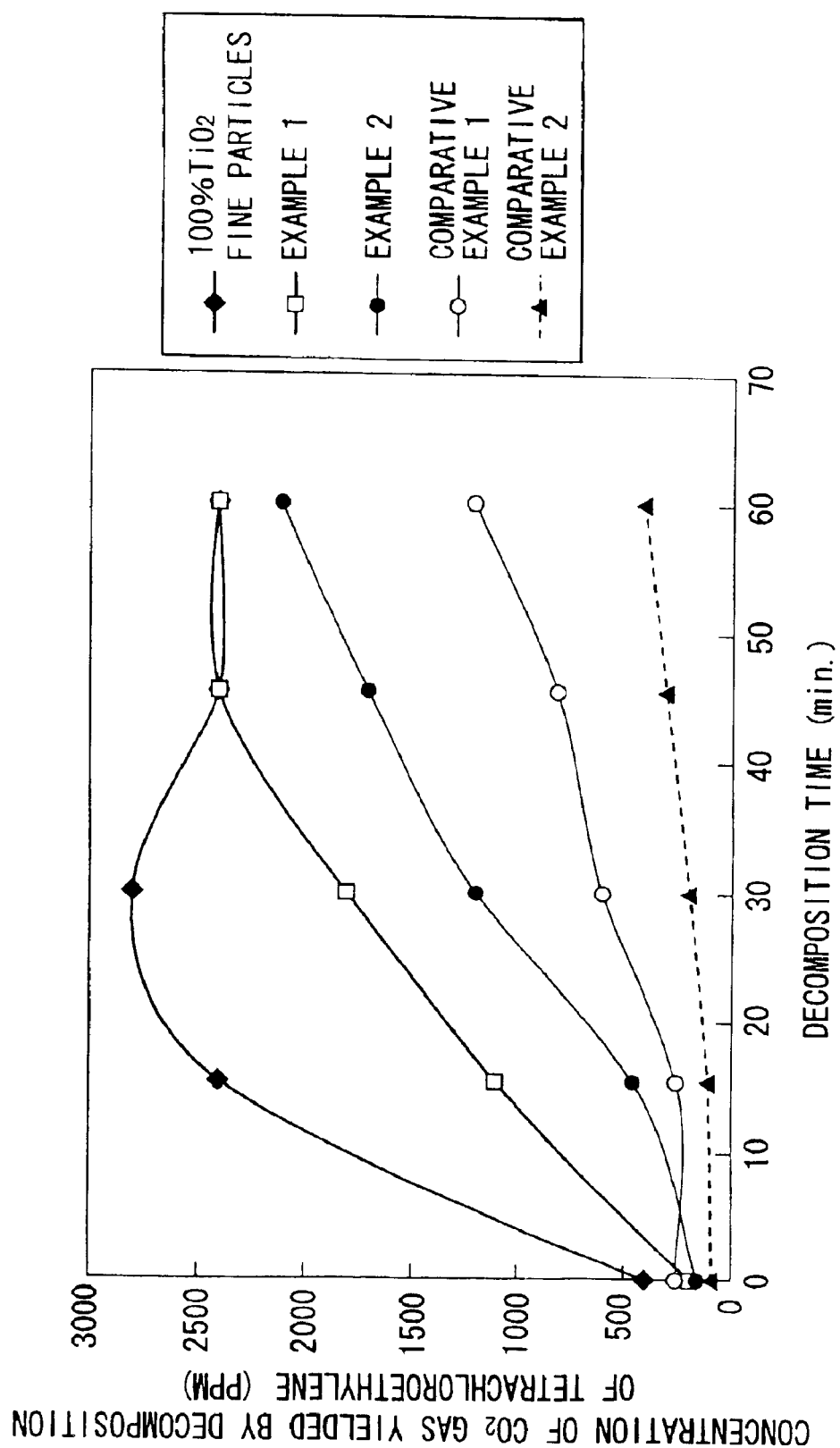

PHOTOCATALYST GRANULES

BACKGROUND OF THE INVENTION

1. Field of the Invention

The present invention relates to photocatalyst granules capable of decomposing an organic matter by employing light energy, and a method of preparing the same.

The present application is based on Japanese Patent Application No. Hei 11-371947 filed in Japan, the content of which is incorporated herein by reference.

2. Background Art

The photocatalytic reaction is a reaction that decomposes an organic matter by using a photocatalyst in the presence of light energy. Since this reaction belongs to a technique of decomposing harmful organic matter by employing ultraviolet light included in sunlight or indoor illumination, such as fluorescent lamp or incandescent lamp, its application for purification of water or air and construction materials such as building materials and tiles has widely been studied.

As the photocatalyst, titanium dioxide has generally been used. The organic matter is decomposed and made innoxious by being irradiated ultraviolet light in the presence of titanium dioxide. As the raw material of titanium dioxide photocatalyst, fine particles of titanium dioxide and an alkoxide solution of metallic titanium have conventionally been employed.

When using fine titanium dioxide particles, there can be used a method of using fine titanium dioxide particles as they are, a method of using fine titanium dioxide particles after fixing them on a solid using a binder, and a method of using titanium dioxide particles after mixing them with a coating composition or a hydrate, followed by coating on the solid, drying and further fixation. There can be used what is termed a sol-gel method, wherein the alkoxide solution of metallic titanium is used as the raw material. After coating a solid with this solution, drying the solution and firing the dried matter to form a titanium dioxide thin film, this film is used as the photocatalyst.

There can also be used a method of using as a photocatalyst after forming a titanium dioxide thin film on a solid using a CVD or sputtering method.

When using the titanium dioxide fine particles as they are, the photoactivity is high and the adsorbability of the organic matter is high because of the large surface area. However, it is hard to handle because of the fine particles, thereby making it difficult to control the position of the fine particles when using them in an air or liquid. In case these fine particles are scattered or dispersed, these scattered or dispersed fine particles cause scattering of ultraviolet light, resulting in poor photoefficiency. It is also difficult to recover the fine particles.

When using the fine particles after they are fixed on a solid using a binder, the fine particles are coated with or embedded in the binder. Therefore, the surface area of the fine particles in contact with the organic matter, oxygen or ultraviolet light is lowered, thereby lowering the decomposition efficiency of the organic matter. When using an organic binder, there arises a problem that binder itself is decomposed by the titanium dioxide fine particles.

When used after forming a thin film from an alkoxide solution of metallic titanium on a solid using a sol-gel method, there is a merit that the thin film does not exert any influence on the form of the solid and a thin film can be formed between small spaces. An anatase type crystal of titanium dioxide having high photocatalytic activity can be formed by firing at a temperature of 600° C. or less. However, it takes a long time to prepare a thin film of the anatase type crystal and, moreover, the preparation conditions cannot be controlled easily. There is also the problem that the contact area with the organic matter is smaller than that in the case of the fine particles of titanium dioxide because of the thin film, and thus the decomposition efficiency is low and the adsorbability of the organic matter is poor. There is also the problem that the durability of the thin film is low.

SUMMARY OF THE INVENTION

An object of the present invention is to provide photocatalyst granules, which are superior in durability and are easy to handle and also can be fixed on a solid while maintaining large surface area, high organic matter adsorbability and photoactivity of photocatalyst fine particles.

The photocatalyst granules of the present invention are photocatalyst granules prepared by molding a mixture containing 10% by weight or more of photocatalyst particles and colloidal silica, and drying the molded mixture.

In the photocatalyst granules of the present invention, colloidal silica capable of forming a three-dimensional long-chain network is used as a binder. Therefore, the large surface area of the photocatalyst particles can be maintained. Thereby the contact between the photocatalyst particles and the open air is not inhibited, thus making it possible to maintain high photocatalytic activity. Accordingly, the photocatalyst granules of the present invention are easy to handle and can be fixed on a solid, and also superior in photocatalytic activity, thus making it possible to use for various purposes.

BRIEF DESCRIPTION OF THE DRAWINGS

The FIGURE is a graph showing performance of the photocatalyst granules obtained in the Example.

DESCRIPTION OF THE PREFERRED EMBODIMENTS

The present invention will be described in detail below.

The photocatalyst particles used in the present invention are not specifically limited as far as they are capable of conducting the photocatalytic reaction, but are usually particles made of known photocatalysts such as titanium dioxide, zinc oxide, cadmium selenide, arsenic gallium, and strontium titanate. More preferably, the photocatalyst particles having an average particle diameter of 300 nm or less and a particle size distribution within a range of 3–500 nm are used. The photocatalyst particles having such average particle diameter and particle size distribution are preferable because of large surface area and high photoactivity.

The colloidal silica used in the present invention acts as a binder. The colloidal silica is that wherein colloidal particles of amorphous silica are stably dispersed in an aqueous solution. By drying the colloidal silica, a three-dimensional long-chain network of silica is formed by an operation of a coagulation force of colloidal particles. When using such colloidal silica as the binder, the fine photocatalyst particles are retained in the state of being interposed between the space of the three-dimensional long-chain network of silica. Therefore, with the large surface area and high photoactivity of the photocatalyst particles and the contact between the photocatalyst particles and the organic matter as a substance to be decomposed, ultraviolet light or oxygen, the photocatalyst fine particles can be molded into granules. Furthermore, the resulting photocatalyst granules are also superior in mechanical strength and durability.

The colloidal silica is not specifically limited, but is preferably colloidal silica having an amorphous content within a range of 10–50% by weight. When using colloidal silica having an amorphous content of less than 10% by weight, the mechanical strength of the photocatalyst granules sometimes becomes insufficient. On the other hand, when using colloidal silica having an amorphous content of more than 50% by weight, stable dispersed state cannot be maintained because of too large an amorphous content and it is sometimes not suited for use. The particle diameter of the amorphous silica is preferably within a range of about 30–50 nm. When the particle diameter is less than 30 nm, the strength of the granules sometimes becomes insufficient. On the other hand, when the particle diameter exceeds 50 nm, sometimes performances for retaining the photocatalyst particles are lowered. Furthermore, the colloidal silica is usually alkaline to stabilize the dispersed state of the colloidal silica, and contains 0.2% by weight or less of an alkali component such as $Na_2O$.

Colloidal silica capable of forming a network having large permeability to air by drying is preferable, and specific examples thereof include SNOWTEX PS SERIES manufactured by Nissan Chemical Industries Co., Ltd.

The photocatalyst granules of the present invention are photocatalyst granules prepared by molding a mixture containing photocatalyst particles and colloidal silica and drying the molded mixture, and the content of the photocatalyst particles in the photocatalyst granules is 10% by weight or more. When the content of the photocatalyst particles in the photocatalyst granules is less than 10%, the photocatalytic activity becomes insufficient.

Fillers may be added in the mixture containing photocatalyst particles and colloidal silica. The addition of the filler improves the moldability, mechanical strength, and durability of the photocatalyst granules, and also improves the adsorbability of the organic matter. The addition of the filler can also appropriately control the volume and density of the photocatalyst granules.

The filler is not specifically limited, but is preferably an inorganic filler of at least one selected from magnesium silicate, aluminum silicate, calcium silicate, sodium silicate, calcium sulfate, calcium carbonate, lime, clay mineral, aluminum salt, ceramics, active carbon, zeolite, inorganic whisker, and inorganic fiber. Regarding the size of the filler, the filler preferably has an average particle diameter within a range of about 0.1 to 100 μm in the case that the filler is in the form of powder. In case of whisker, the filler preferably has a length within a range of about 0.1–10 μm. In case of inorganic fiber, the filler preferably has a length within a range of about 0.1–5 mm.

The content of the filler in the photocatalyst granules is 60% by weight or less. When the content is more than 60% by weight, the activity of the photocatalyst granules is inhibited and the photocatalytic activity becomes insufficient. Therefore, the resulting photocatalyst granules are not suited for practical use.

The size of the photocatalyst granules is not specifically limited as far as the size is easy to handle and is suited for purposes. The size having a maximum length portion of the granules within a range of 1–10 mm and a minimum length portion of the granules within a range of 0.1–10 mm is preferable because of easy manufacturing and excellent productivity.

These photocatalyst granules are prepared in the following manner.

First, photocatalyst particles and colloidal silica are sufficiently kneaded to obtain a mixture. In this case, fillers may be added, if necessary. Then, a molding machine such as granulator, pelletizer, extruder, or injection molding machine is filled with the resulting mixture and the mixture is molded and, furthermore, the resulting molded object is hardened by drying.

The shape of the molded object is not specifically limited, and can be appropriately selected from columnar, rectangular and spherical shapes according to the purposes. In case the photocatalyst particles are made of titanium dioxide, the photocatalytic activity of the photocatalyst particles having an anatase crystal form is particularly high so that the anatase crystal form is retained by adjusting the drying temperature to 600° C. or less, particularly preferably. In case the photocatalyst particles are made of materials other than titanium dioxide, the drying conditions are not specifically limited but the molded object is usually dried at a temperature within a range of about 5–200° C. for 2–4 hours.

The surface of the resulting photocatalyst granules may be provided with unevenness such as emboss and relief, thereby to increase the surface area of the photocatalyst granules and to improve the decomposition efficiency of the organic matter. Such unevenness can be formed by subjecting the surface of the photocatalyst granules to machining, sand blast treatment, or the like.

The photocatalyst granules thus obtained can maintain a large surface area of the photocatalyst particles and contact with the external air is not inhibited, thereby making it possible to maintain high catalytic activity, because colloidal silica capable of forming a three-dimensional long-chain network as a binder. Therefore, the resulting photocatalyst granules are easy to handle and can be fixed on a solid, and is also superior in photocatalytic activity. Thus, the photocatalyst granules can be used for various purposes.

The addition of the filler to the photocatalyst granules further improves the moldability, mechanical strength, and durability of the photocatalyst granules as well as the adsorbability of an organic matter and also appropriately control the volume and density of the photocatalyst granules, thereby to further promote application for various purposes.

Embodiments

The following Examples further illustrate the present invention in detail.

EXAMPLE 1

50 parts by weight of anatase crystal form titanium dioxide photocatalyst fine-powders having an average particle diameter within a range of about 5–300 nm and particle size distribution within a range of about 3–500 nm and 50 parts by weight of colloidal silica (PS-M, manufactured by Nissan Chemical Industries Co., Ltd.) having an amorphous silica content of 20% by weight and an alkali content of less than 0.2% by weight were mixed. The resulting mixture was sufficiently kneaded and then charged in a pelletizer. The mixture charged in the pelletizer was extruded through a die hole and cut into pieces of 5 mm in length. In this case, the shape of the die hole was circle of 3 mm in diameter.

The photocatalyst granule precursor thus obtained was allowed to stand at room temperature (25–30° C.) for 48 hours and then hardened by air drying to obtain photocatalyst granules wherein the content of photocatalyst particles is 70% by weight. These granules were in the columnar shape (bottom: circle of 2.5–2.8 mm in diameter, height: 4.2–4.7 mm) and had sufficient mechanical strength. Therefore, the granules were suited for practical use.

EXAMPLE 2

30 parts by weight of anatase crystal form titanium dioxide photocatalyst fine-powders having an average particle diameter within a range of about 5–300 nm and particle size distribution within a range of about 3–500 nm, 30 parts by weight of glass fibers wherein short glass fibers have a fiber length within a range of 30–100 $\mu$m and 40 parts by weight of colloidal silica (PS-M, manufactured by Nissan Chemical Industries Co., Ltd.) having an amorphous silica content of 20% by weight and an alkali content of less than 0.2% by weight were mixed. The resulting mixture was sufficiently kneaded and then charged in a pelletizer. The mixture was extruded through a die hole and cut into pieces of 5 mm in length. In this case, the shape of the die hole was a circle of 3 mm in diameter. The photocatalyst granule precursor thus obtained was allowed to stand at room temperature (25–30° C.) for 48 hours and then hardened by air drying to obtain photocatalyst granules wherein the content of photocatalyst particles is 35% by weight. These granules are in the columnar shape (bottom: circle of 2.8–3.0 mm in diameter, height: 4.7–5.0 mm). The mechanical strength of these photocatalyst granules was about two times as large as that of the photocatalyst granules obtained in Example 1. Therefore, the granules were suited for practical use because of sufficient mechanical strength.

COMPARATIVE EXAMPLE 1

In the same manner as in Example 2, except that 5 parts by weight of anatase crystal form titanium dioxide photocatalyst fine-powders, 30 parts by weight of glass short fibers and 40 parts by weight of colloidal silica (PS-M, manufactured by Nissan Chemical Industries Co., Ltd.) were used, photocatalyst granules wherein the content of photocatalyst particles is 9% by weight were obtained.

COMPARATIVE EXAMPLE 2

In the same manner as in Example 1, except that 30 parts by weight of anatase crystal form titanium dioxide photocatalyst fine-powders was used and 70 parts by weight of water-glass (potassium silicate, manufactured by Wako Pure Chemicals Industries Ltd.) was used in place of colloidal silica, photocatalyst granules wherein the content of photocatalyst particles is 30% by weight were obtained.

TEST EXAMPLE

Using the photocatalyst granules obtained in Examples 1–2 and Comparative Examples 1–2 and anatase crystal form titanium dioxide photocatalyst fine-powders (100% $TiO_2$) were respectively used as the photocatalyst, tetrachloroethylene was decomposed.

A relation between the decomposition rime (minutes) and the concentration (ppm) of a carbon dioxide gas evolved by the decomposition of tetrachloroethylene when using the photocatalyst granules obtained in Examples 1–2 and Comparative Examples 1–2 and titanium dioxide type simple photocatalyst fine-powders substance is shown in the FIGURE.

Tetrachloroethylene was decomposed under the following conditions.

In a glass desiccator having an inner volume of 10 liter, the respective photocatalyst granules were placed on a glass petri dish having a diameter of 12 cm to spread over the whole surface of the petri dish, and then sealed in the glass desiccator (fixed irradiation area). After injecting 50 $\mu$l of tetrachloroethylene into the glass desiccator using a syringe, the photocatalyst granules were irradiated with 400 W black light from the outside. Then, an internal gas was collected each 15 minutes and the concentration of tetrachloroethylene and that of a carbon dioxide gas were measured. Tetrachloroethylene injected into the glass desiccator is naturally evaporated and converted into a gas, thereby contacting with the photocatalyst granules due to a gas motion.

As is apparent from the FIGURE, the decomposition capability of the photocatalyst granules obtained in Examples 1 and 2 at the decomposition time of 45 minutes is the same as or about 70% of that in case of using the anatase crystal form titanium dioxide photocatalyst fine-powders (100% $TiO_2$). That is, the photocatalyst granules of Examples 1 and 2 maintained the photocatalytic activity at high level and were suited for practical use.

On the other hand, regarding the photocatalyst granules obtained in Comparative Example 1, the content of the photocatalyst particles was 10% by weight or less and the decomposition capability was ⅓ or less of that in case of using the anatase crystal form titanium dioxide photocatalyst fine-powders(100% $TiO_2$). The photocatalyst granules obtained in Comparative Example 2 was insufficient in decomposition capability because water-glass is used as the binder.

What is claimed is:

1. Photocatalyst granules comprising 10% by weight or more of photocatalyst particles with a balance of silica particles, the granules having a columnar shape with a diameter of 2.5 to 3.0 mm, and a length of 4.2 to 5.0 mm.

2. Photocatalyst granules according to claim 1, wherein a filler is comprised.

3. Photocatalyst granules according to claim 2, wherein the filler is at least one selected from the group consisting of magnesium silicate, aluminum silicate, calcium silicate, sodium silicate, calcium sulfate, calcium carbonate, lime, clay mineral, aluminum salt, ceramics, active carbon, zeolite, inorganic whisker, and inorganic fiber.

4. Photocatalyst granules according to claim 1, wherein the photocatalyst particles are titanium dioxide.

5. Photocatalyst granules according to claim 1, wherein a particle diameter of the silica is within a range of 30–50 nm.

6. Photocatalyst granules according to claim 1, wherein the surface is uneven.

* * * * *